Figure 3:
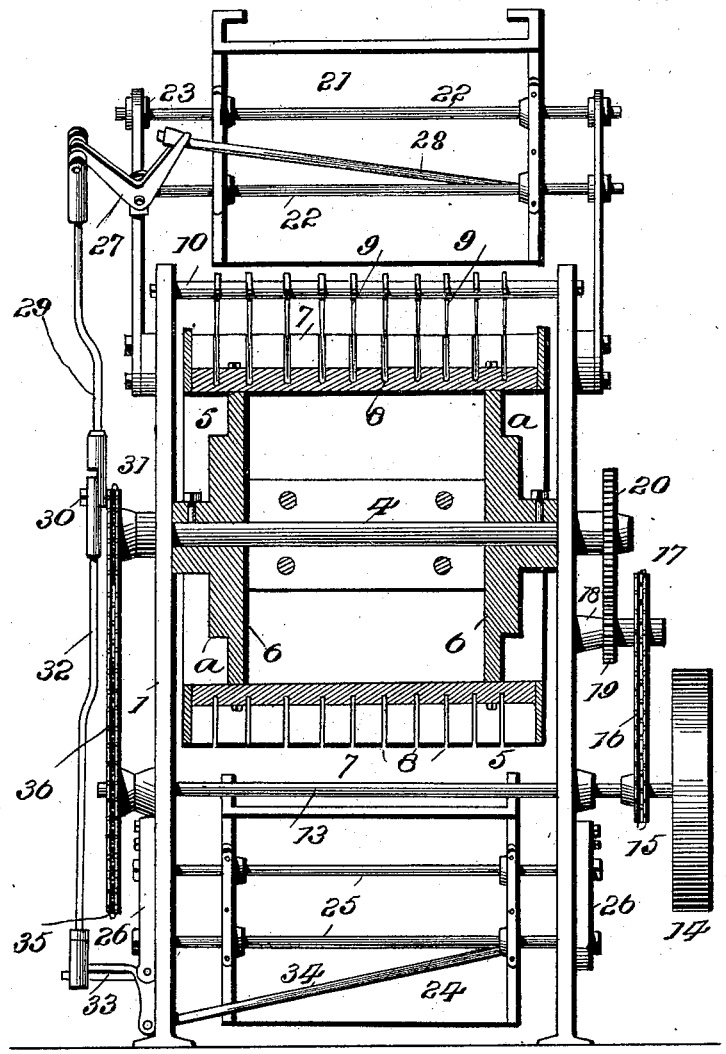

No. 674,273. Patented May 14, 1901.
E. J. LEWIS.
MACHINE FOR CUTTING VEGETABLES.
(Application filed Aug. 29, 1900.)
(No Model.) 2 Sheets—Sheet 1.
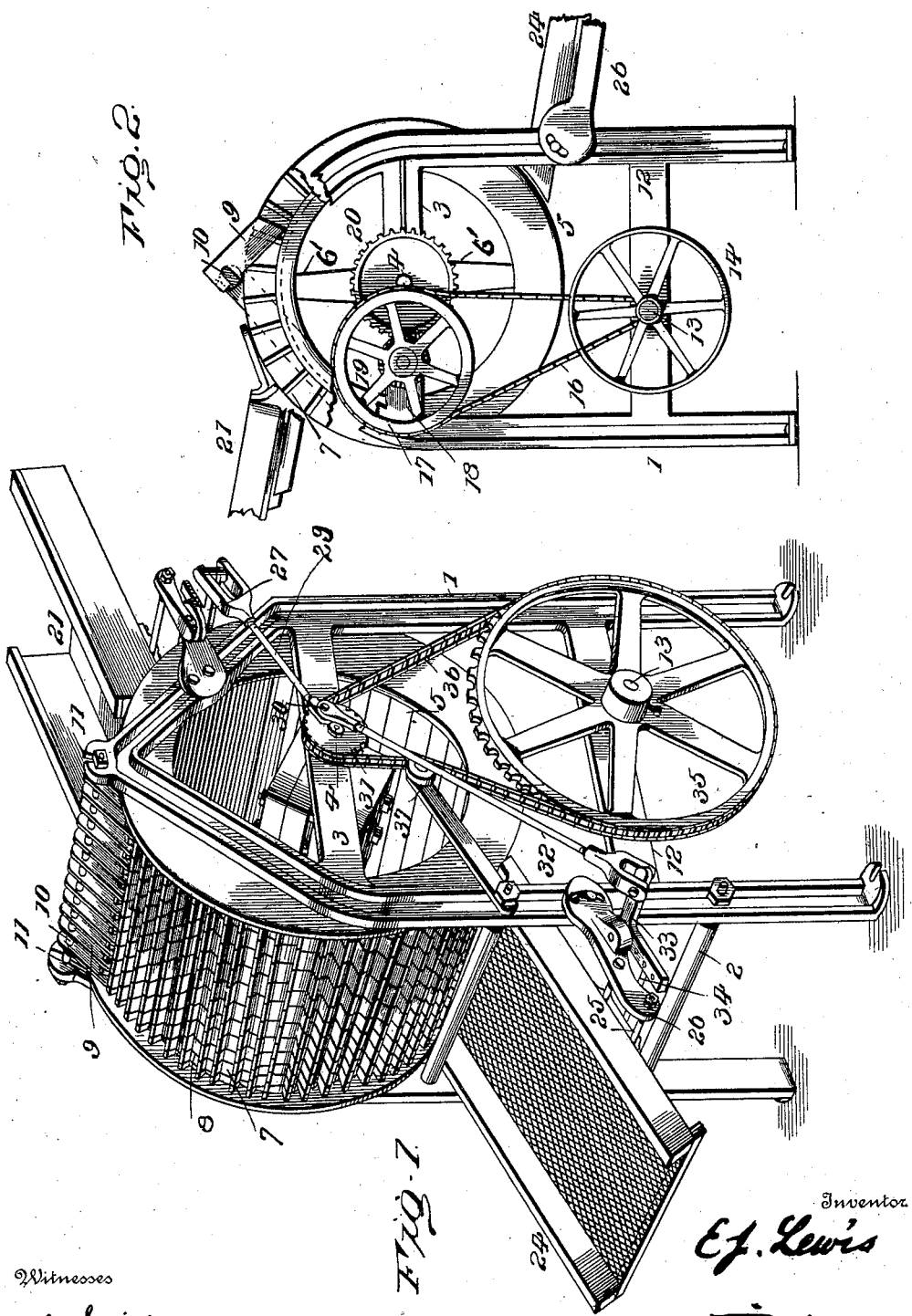

No. 674,273. Patented May 14, 1901.
E. J. LEWIS.
MACHINE FOR CUTTING VEGETABLES.
(Application filed Aug. 29, 1900.)
(No Model.) 2 Sheets—Sheet 2.

Witnesses Inventor
E. J. Lewis
By J. R. Nottingham
Attorney

UNITED STATES PATENT OFFICE.

ELGIE J. LEWIS, OF MIDDLEPORT, NEW YORK.

MACHINE FOR CUTTING VEGETABLES.

SPECIFICATION forming part of Letters Patent No. 674,273, dated May 14, 1901.

Application filed August 29, 1900. Serial No. 28,394. (No model.)

*To all whom it may concern:*

Be it known that I, ELGIE J. LEWIS, a citizen of the United States, residing at Middleport, in the county of Niagara and State of New York, have invented certain new and useful Improvements in Machines for Cutting Vegetables; and I do hereby declare the following to be a full, clear, and exact description of the invention, such as will enable others skilled in the art to which it appertains to make and use the same.

My invention relates to machines for cutting vegetables, especially the string-bean variety; and it consists generally of the novel construction and arrangement of the various parts and their combination, as will be hereinafter more fully described, and briefly stated in the claims.

The prime object of the invention is to produce a machine of the character mentioned of the cheapest and simplest form consistent with strength, durability, and efficiency in operation.

Other objects will become apparent upon further description of the invention.

In the drawings, Figure 1 is a perspective view of my improved machine. Fig. 2 is a side elevation with a portion of the frame broken away to show the relative relation of the cutters with the drum-partitions; and Fig. 3 is a vertical transverse section taken through the center of the machine, showing the mechanism for agitating the hopper and delivery-chute.

In the several views the numeral 1 indicates the frame of the machine, which is composed of two suitably-constructed sides secured together by bars 2. The sides are provided with cross-bars 3 3, in which is journaled a shaft 4, and mounted upon this shaft is a drum 5. The drum is supported on the shaft by means of end supports 6 6, to which the shell of the drum is secured, as shown at *a*, Fig. 3, or by spiders 6' 6', as shown in Fig. 2, or these supports may consist of two pieces of any suitable material bolted together and provided with a bore for the reception of the shaft, as shown in Fig. 1. The outer periphery of the drum is provided with a series of longitudinal partitions 7, having kerfs 8 to receive the cutter-blades 9, which cutter-blades are removably mounted on a bar 10, secured in slots 11 at the apex of the sides of the frame.

Journaled in cross-bars 12 of the sides of the frame is a driving-shaft 13, and mounted on one end thereof is a driving band-wheel 14, which receives its power from any suitable source. Mounted on the shaft 13 is a small sprocket-wheel 15, which is connected by a chain 16 with a large sprocket-wheel 17, the latter wheel being mounted on an arm 18, projecting from the side of the frame. Secured upon the arm 18 is a small gear-wheel 19, which meshes with a larger gear-wheel 20, secured upon one end of the drum-shaft. When power is applied to the driving-wheel, motion will be transmitted to the drum through the medium of the sprocket-wheels 15 17 and gear-wheels 19 20.

The numeral 21 indicates a shaker-hopper which is secured on rods 22 22, mounted in brackets or arms 23 23, adjustably secured to the sides of the frame.

The numeral 24 indicates a shaker delivery-chute which is provided with a wire-cloth bottom and is supported upon rods 25 25, mounted in adjustably-secured brackets or arms 26 26, similar to the hopper.

Pivoted upon one of the brackets 23 is an angle-arm 27, to one end of which is loosely connected one end of a rod 28, the other end of said rod being pivoted to the hopper. The other end of the angle-arm is swiveled to one end of a link 29, the other end of said link being pivoted on a crank-pin 30, secured to a sprocket-wheel 31, mounted loosely on the drum-shaft. Pivoted on the crank-pin 30 is one end of a link 32, the other end of said link being swiveled to one arm of an angle-lever 33. The other arm of the angle-lever is pivotally connected to one end of an adjustable rod 34, the other end of said rod being pivoted to the delivery-chute. Secured on the main driving-shaft is a sprocket-wheel 35, which is connected by a chain 36 with the sprocket-wheel 31.

It will be noted that by reason of the adjustability of the bar 10 the inclination and pressure of the cutter-blades may be varied.
A suitable tightening device 37 is employed to take up the slack in the chain.

When power is applied to the driving-shaft, motion will be imparted to the sprocket-wheel 31, which will cause a vibratory motion of the hopper to feed the beans into the spaces between the partitions 7 and of the delivery-chute to clean the cut beans of any dirt or small particles of beans which may be present. Further description of the operation of the machine is unnecessary, as the entire operation is perfectly apparent.

Having thus fully described my invention, what I claim, and desire to secure by Letters Patent, is—

1. In a machine for cutting vegetables, the combination with a rotatable drum having partitions provided with kerfs, of cutter-blades removably secured on an adjustable bar located above said drum, a feed-hopper and a delivery-chute, and means for vibrating the hopper and chute.

2. In a machine for cutting vegetables, the combination with a rotatable drum having partitions provided with kerfs, of cutter-blades removably secured on an adjustable bar located above the drum, a feed-hopper, mechanism for vibrating the same, said mechanism consisting of a pivoted angle-arm having one arm connected to the hopper and the other arm connected with a crank-pin of a sprocket-wheel mounted on the drum-shaft, and means for driving said sprocket-wheel, as set forth.

3. In a machine for cutting vegetables, the combination with a rotatable drum having partitions provided with kerfs, of cutter-blades removably secured on an adjustable bar located above the drum, a feed-hopper, mechanism for vibrating the same, said mechanism consisting of a pivoted angle-arm having one arm connected to the hopper and the other arm connected with a crank-pin of a sprocket-wheel mounted on the drum-shaft, means for driving said sprocket-wheel, a delivery-chute, and means for vibrating said chute, as set forth.

In testimony whereof I affix my signature in the presence of two witnesses.

ELGIE J. LEWIS.

Witnesses:
 ELLA HICKEY,
 T. H. FRANKLIN.